（12）United States Patent
Homma

(10) Patent No.: US 9,247,206 B2
(45) Date of Patent: Jan. 26, 2016

(54) INFORMATION PROCESSING DEVICE, INFORMATION PROCESSING SYSTEM, AND INFORMATION PROCESSING METHOD

(71) Applicant: Takeshi Homma, Kanagawa (JP)

(72) Inventor: Takeshi Homma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 14 days.

(21) Appl. No.: 14/451,660

(22) Filed: Aug. 5, 2014

(65) Prior Publication Data

US 2015/0042749 A1    Feb. 12, 2015

(30) Foreign Application Priority Data

Aug. 9, 2013    (JP) .................................. 2013-166760

(51) Int. Cl.
*H04N 7/15*    (2006.01)
*H04L 29/06*    (2006.01)

(52) U.S. Cl.
CPC .............. *H04N 7/157* (2013.01); *H04L 65/403* (2013.01); *H04M 2203/1025* (2013.01)

(58) Field of Classification Search
None
See application file for complete search history.

(56) References Cited

U.S. PATENT DOCUMENTS

| 8,243,116 | B2* | 8/2012 | Qvarfordt | .......... G06K 9/00335 348/14.01 |
| 2010/0257462 | A1* | 10/2010 | Barrett | ................... H04N 7/147 715/756 |
| 2014/0152761 | A1 | 6/2014 | Homma | |

FOREIGN PATENT DOCUMENTS

| JP | 11-224152 | 8/1999 |
| JP | 3593067 | 11/2004 |
| JP | 2009-077380 | 4/2009 |
| JP | 2010-246085 | 10/2010 |
| JP | 2014-110558 | 6/2014 |

\* cited by examiner

*Primary Examiner* — Fan Tsang
*Assistant Examiner* — Jeffrey Lytle
(74) *Attorney, Agent, or Firm* — Oblon, McClelland, Maier & Neustadt, L.L.P.

(57) ABSTRACT

An information processing device is located at a second spot and communicates with another information processing device located at a first spot. The information processing device includes an acquisition unit for acquiring first motion information of a user of the other information processing device at the first spot; a specification unit for specifying first meaning information indicating a meaning of the first motion information at the first spot and second meaning information indicating a meaning of the first meaning information at the second spot; a correction unit for correcting the first motion information based on a difference between the first and second meaning information, such that the first motion information indicates the first meaning information at the second spot; and a generation unit for generating an object of the user of the other information processing device at the first spot, based on the corrected first motion information.

17 Claims, 19 Drawing Sheets

FIG.5

| LABEL | MOTION TYPE | STANDARD OF MOTION INFORMATION | MEANING OF MOTION INFORMATION |
|---|---|---|---|
| A-1 | NODDING | TIME: THRESHOLD TIME IS SET<br>FACE/UPPER BODY: FACING DIRECTLY FORWARD AT STARTING TIME<br>FACE: TILT FORWARD BY GREATER THAN OR EQUAL TO THRESHOLD ANGLE (FOR EXAMPLE, 5 DEGREES) WITHIN THRESHOLD TIME<br>FACE: RESTORED WITHIN THRESHOLD TIME AFTER TILTING FORWARD STATE, ETC.: NO DISPLACEMENT OF GREATER THAN OR EQUAL TO THRESHOLD | AFFIRMATIVE/LISTENING ACTIVELY |
| A-1.1 | NODDING | NODDING WITH VOICE<br>FACE: TILT FORWARD BY GREATER THAN OR EQUAL TO 5 DEGREES<br>FACE: RESTORED WITHIN 500 ms FROM START OF MOTION | AFFIRMATIVE |
| A-2 | LOOKING AWAY | AT CERTAIN TIME POINT, ROTATION ANGLE OF FACE WITH RESPECT TO DIRECTLY FORWARD DIRECTION IS GREATER THAN OR EQUAL TO THRESHOLD | NONE |
| A-3 | SHAKE HEAD TO LEFT AND RIGHT | TIME: THRESHOLD TIME IS SET<br>FACE: ROTATION ANGLE IS DEVIATED FROM DIRECTLY FORWARD DIRECTION BY GREATER THAN OR EQUAL TO THRESHOLD ANGLE IN LEFT/RIGHT DIRECTION WITHIN THRESHOLD TIME<br>FACE: FACING DIRECTLY FORWARD WITHIN THRESHOLD TIME | NEGATIVE |
| A-4 | MOVING HAND | UPPER ARM/FRONT ARM: POSITION/ANGLE HAS VARIED BY GREATER THAN OR EQUAL TO THRESHOLD | INDEFINITE |
| A-5 | DURING SPEECH | VOICE IS DETECTED<br>LIPS ARE DISPLACED | INDEFINITE |
| A-6 | NO MOTION | THERE ARE NO PARTS THAT HAVE CHANGED BY GREATER THAN OR EQUAL TO THRESHOLD WITHIN CERTAIN TIME | NONE |
| A-7 | MOTION UNKNOWN | THERE ARE MOTIONS BUT CANNOT BE DETERMINED | INDEFINITE |

FIG.6

| LABEL | MOTION TYPE | STANDARD OF MOTION INFORMATION | MEANING OF MOTION INFORMATION |
|---|---|---|---|
| B-1 | CONTINUOUS SPEECH | CONTINUE SPEECH FOR GREATER THAN OR EQUAL TO THRESHOLD TIME | — |
| B-2 | VOICE VOLUME INCREASES | GRADUALLY INCREASE VOICE VOLUME FOR GREATER THAN OR EQUAL TO THRESHOLD TIME | EXCITEMENT |
| B-3 | VOICE VOLUME RAPIDLY INCREASES | VOICE VOLUME INCREASES BY GREATER THAN OR EQUAL TO THRESHOLD WITHIN THRESHOLD TIME | — |
| B-4 | VOICE VOLUME RAPIDLY DECREASES | VOICE VOLUME DECREASES BY GREATER THAN OR EQUAL TO THRESHOLD WITHIN THRESHOLD TIME | — |
| B-5 | CONTINUOUS SILENCE | SILENCE FOR GREATER THAN OR EQUAL TO THRESHOLD TIME | NONE |
| B-6 | VOICE VOLUME VARIES | CONTINUE SPEECH FOR GREATER THAN OR EQUAL TO THRESHOLD TIME, VOICE VOLUME VARIES BY GREATER THAN OR EQUAL TO THRESHOLD | ANXIETY |

FIG.7

| LABEL | EXPRESSION TYPE | STANDARD OF MOTION INFORMATION | MEANING OF MOTION INFORMATION |
|---|---|---|---|
| C-1 | SMILE | EYES: BOTH EYES LOOKING STRAIGHT AHEAD<br>LIPS: EXTENDED IN HORIZONTAL DIRECTION<br>CONTINUATION TIME: GREATER THAN OR EQUAL TO THRESHOLD | SMILE |
| C-2 | SURPRISE | EYES: LOOKING STRAIGHT AHEAD AND OPEN BY GREATER THAN OR EQUAL TO THRESHOLD<br>STILL CONTINUATION TIME: GREATER THAN OR EQUAL TO THRESHOLD | SURPRISED |
| C-3 | INDEFINITE DUE TO LOOKING AWAY | AT CERTAIN TIME POINT, ROTATION ANGLE OF FACE WITH RESPECT TO DIRECTLY FORWARD DIRECTION IS GREATER THAN OR EQUAL TO THRESHOLD | – |
| C-4 | INDEFINITE DUE TO ACTION | TIME: THRESHOLD TIME IS SET<br>FACE: FACE IS MOVING SUCH THAT CANNOT BE DETERMINED WITHIN THRESHOLD TIME | – |
| C-5 | DURING SPEECH | VOICE IS DETECTED<br>LIPS ARE DISPLACED | DURING SPEECH |
| C-6 | CONFUSED | EYES: DIRECTIONS ARE INDEFINITE | – |
| C-7 | UNKNOWN | CANNOT BE DETERMINED | – |

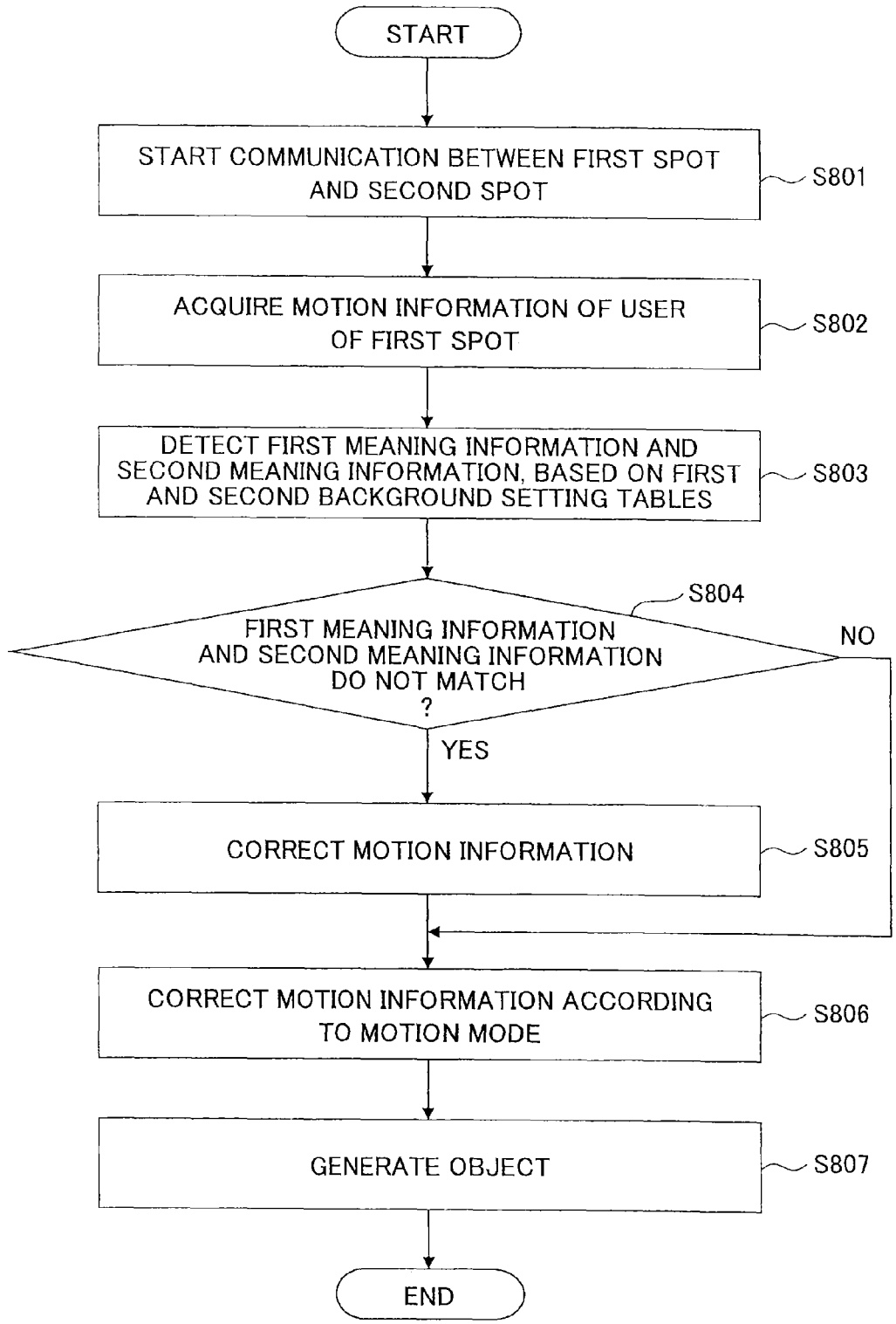

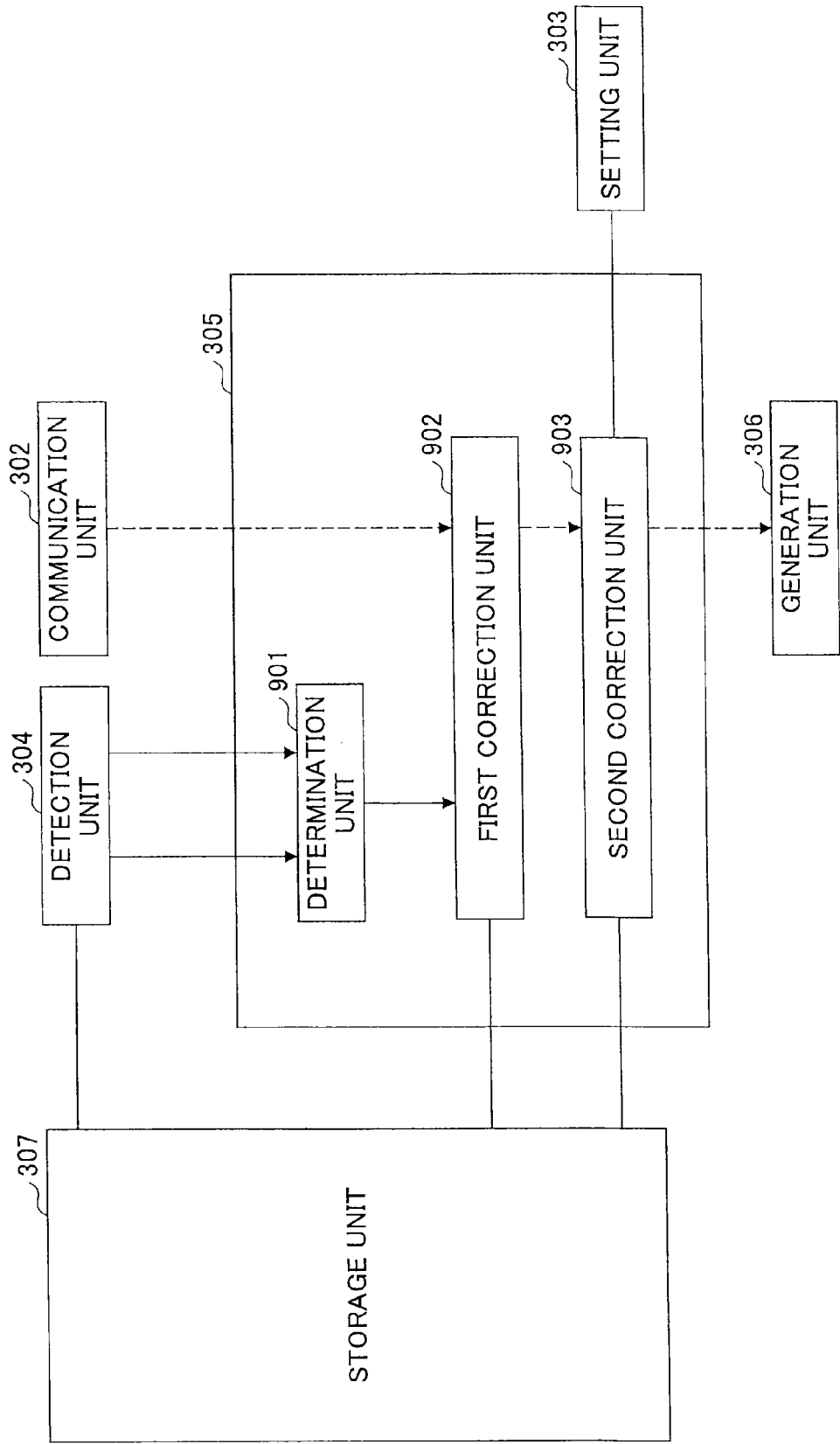

FIG.11

SETTING OF FIRST TABLE (BACKGROUND SETTING TABLE LABEL 1) ~1101

| LABEL | MOTION TYPE | STANDARD OF MOTION INFORMATION | MEANING OF MOTION INFORMATION |
|---|---|---|---|
| A-1.1 | NODDING | NODDING WITH VOICE<br>FACE: TILT FORWARD BY GREATER THAN OR EQUAL TO 5 DEGREES<br>FACE: RESTORED WITHIN 500 ms FROM START OF MOTION | AFFIRMATIVE |

SETTING OF SECOND TABLE (BACKGROUND SETTING TABLE LABEL 4) ~1102

| LABEL | MOTION TYPE | STANDARD OF MOTION INFORMATION | MEANING OF MOTION INFORMATION |
|---|---|---|---|
| A-1.1 | NODDING | NODDING WITH VOICE<br>FACE: TILT FORWARD BY GREATER THAN OR EQUAL TO 10 DEGREES<br>FACE: RESTORED WITHIN 500 ms FROM START OF MOTION | AFFIRMATIVE |

FIG.12

| LABEL | MOTION TYPE | FIRST TABLE 1201 | SECOND TABLE 1202 | CORRECTION CONTENT 1203 |
|---|---|---|---|---|
| A-1.1 | NODDING | 1 | 2 | FACE: INCREASE MOTION BY 10% |
| | | | 3 | FACE: INCREASE MOTION BY 30% |
| | | | 4 | FACE: INCREASE MOTION BY 50% |
| | | 2 | 1 | FACE: DECREASE MOTION BY 10% |
| | | | 3 | FACE: INCREASE MOTION BY 15% |
| | | | ... | ... |

FIG.14

| MOTION/MEANING | CORRECTION MOTION | CORRECTION EXECUTION PROBABILITY |
|---|---|---|
| AFFIRMATIVE | JUMP UP | 0.6 |
| | CLAP HANDS | 0.1 |
| | NOD REPEATEDLY | 0.2 |
| NEGATIVE | LOOK BACKWARD | 0.3 |
| | LOOK SIDEWAYS | 0.2 |
| | LOOK OBLIQUELY DOWNWARD | 0.2 |
| RAPID INCREASE IN VOICE VOLUME | FACE BECOMES LARGE | 0.2 |
| CONTINUOUS INCREASE IN VOICE VOLUME | FACE BECOMES RED | 0.3 |
| CONTINUOUS SPEECH | APPROACHES | 0.1 |
| NO MOTION | BECOMES SMALL | 0.4 |
| | BECOMES PALE (TRANSPARENCY IS INCREASED) | 0.3 |

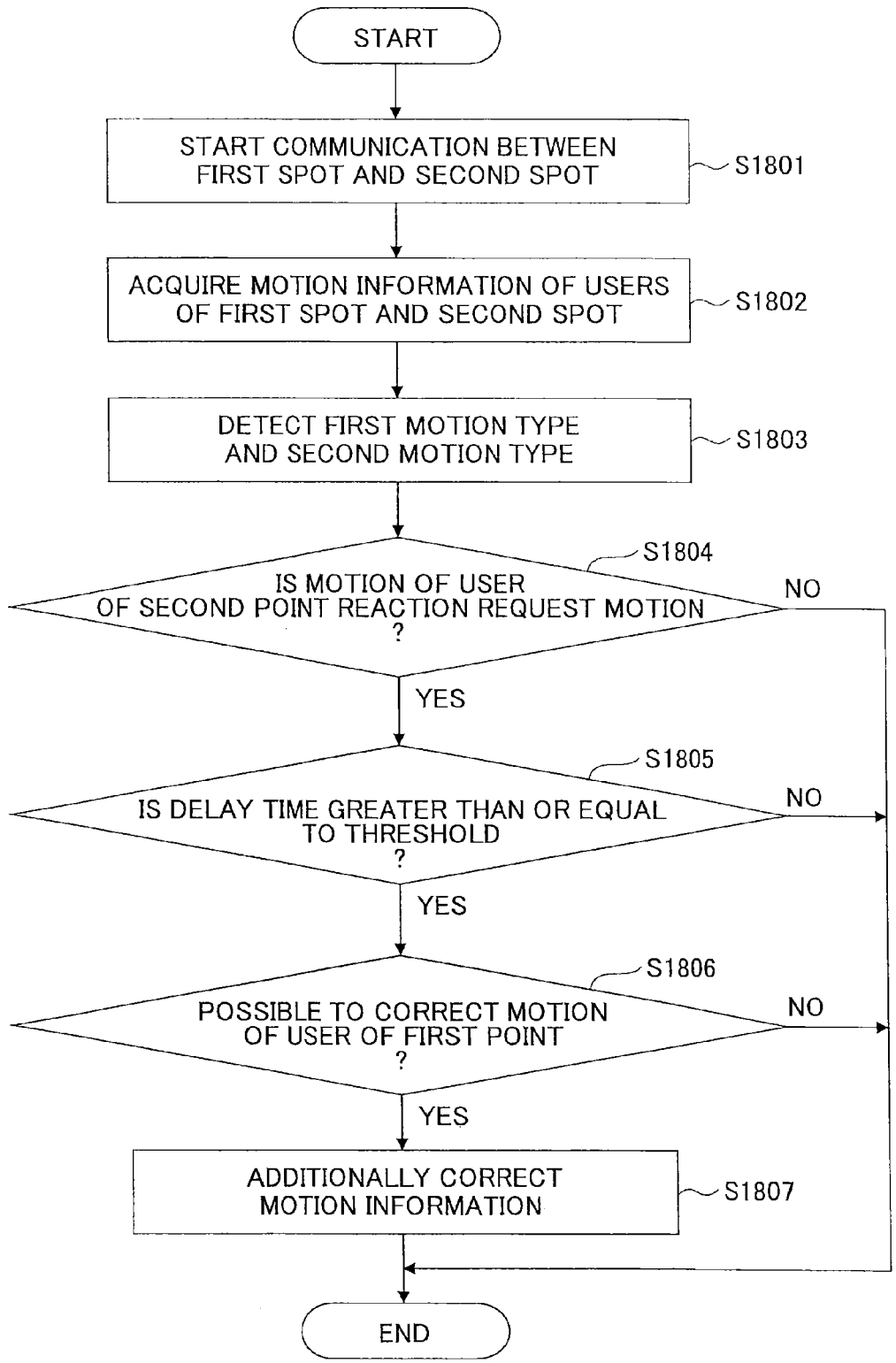

FIG.19

| REQUEST MOTION LABEL | MOTION CHANGE TO BE DETERMINED AS REACTION REQUEST MOTION |
|---|---|
| D-1 | DURING SPEECH → DURING SILENCE |
| D-2 | DURING SILENCE → DURING SPEECH |
| D-3 | NO MOTION → MOVING HANDS |
| D-4 | LOOKING AWAY → NOT LOOKING AWAY |

FIG.20

| LABEL | MOTION TYPE | POSSIBLE TO CORRECT |
|---|---|---|
| E-1 | NODDING | O |
| E-2 | LOOKING AWAY | O |
| E-3 | SHAKE HEAD TO LEFT AND RIGHT | × |
| E-4 | MOVING HAND | × |
| E-5 | DURING SPEECH | × |
| E-6 | NO MOTION | O |
| E-7 | MOTION UNCLEAR | × |

FIG.21

| REQUEST MOTION LABEL | CORRECTION MOTION |
|---|---|
| D-1 | NODDING |
| D-2 | LOOK AT SPEAKER OR NOD |
| D-3 | LOOK AT HAND OR LOOK AT MOVING PERSON |
| D-4 | LOOK AT MOVING PERSON OR NO CORRECTION |

INFORMATION PROCESSING DEVICE, INFORMATION PROCESSING SYSTEM, AND INFORMATION PROCESSING METHOD

BACKGROUND OF THE INVENTION

1. Field of the Invention

The present invention relates to an information processing device, an information processing system, and an information processing method.

2. Description of the Related Art

There is known a remote conference system for realizing conferences such as a video conference in which attendees at remote locations can have a conference, by connecting a plurality of terminal devices via a communication line such as the Internet, and sending and receiving image and voice data in a bidirectional manner. Furthermore, there is also known a technology of holding a remote conference by displaying a pseudo object instead of an actual image (see, for example, Patent Document 1).

Furthermore, there are cases where users having different cultural backgrounds attend a remote conference, and the users cannot sufficiently understand how their gestures and facial expressions will be interpreted by the other party. In order to eliminate such a communication gap due to different cultures, there is known a technology of estimating the meaning of a gesture based on the culture background, and providing the information obtained by the estimation by an icon or a text message (see, for example, Patent Document 2).

By the technology described in Patent Document 2, while a remote conference is being held by exchanging image and voice data with the communication destination, it has been necessary to read and understand the icon or text displayed on a display screen.

Patent Document 1: Japanese Laid-Open Patent Publication No. H11-224152

Patent Document 2: Japanese Laid-Open Patent Publication No. 2010-246085

SUMMARY OF THE INVENTION

The present invention provides an information processing device, an information processing system, and an information processing method, in which one or more of the above-described disadvantages are eliminated.

According to an aspect of the present invention, there is provided an information processing device located at a second spot for performing communication with another information processing device located at a first spot, the information processing device including a first acquisition unit configured to acquire first motion information of a user of the other information processing device at the first spot; a first specification unit configured to specify first meaning information indicating a meaning of the first motion information at the first spot and second meaning information indicating a meaning of the first meaning information at the second spot; a first correction unit configured to correct the first motion information based on a difference between the first meaning information and the second meaning information, such that the first motion information indicates the first meaning information at the second spot; and a generation unit configured to generate an object of the user of the other information processing device at the first spot, based on the first motion information that has been corrected.

According to an aspect of the present invention, there is provided an information processing system for performing communication between an information processing device located at a second spot and another information processing device located at a first spot, the information processing system including a first acquisition unit configured to acquire first motion information of a user of the other information processing device at the first spot; a first specification unit configured to specify first meaning information indicating a meaning of the first motion information at the first spot and second meaning information indicating a meaning of the first meaning information at the second spot; a first correction unit configured to correct the first motion information based on a difference between the first meaning information and the second meaning information, such that the first motion information indicates the first meaning information at the second spot; and a generation unit configured to generate an object of the user of the other information processing device at the first spot, based on the first motion information that has been corrected.

According to an aspect of the present invention, there is provided an information processing method including starting communication between an information processing device located at a second spot and another information processing device located at a first spot; acquiring first motion information of a user of the other information processing device at the first spot; specifying first meaning information indicating a meaning of the first motion information at the first spot and second meaning information indicating a meaning of the first meaning information at the second spot; correcting the first motion information based on a difference between the first meaning information and the second meaning information, such that the first motion information indicates the first meaning information at the second spot; and generating an object of the user of the other information processing device at the first spot, based on the first motion information that has been corrected.

BRIEF DESCRIPTION OF THE DRAWINGS

Other objects, features and advantages of the present invention will become more apparent from the following detailed description when read in conjunction with the accompanying drawings, in which:

FIG. 5 illustrates an example of a motion information table according to the first embodiment;

FIG. 6 illustrates an example of a voice volume determination table according to the first embodiment;

FIG. 7 illustrates an example of an expression determination table according to the first embodiment;

FIG. 8 is a flowchart indicating the flow of the process of the information processing device according to the first embodiment;

FIG. 9 illustrates a configuration of a correction unit according to the first embodiment;

FIG. 11 illustrates an example of a background setting (excerpt) according to the first embodiment;

FIG. 12 illustrates an example of a correction content table according to the first embodiment;

FIG. 14 illustrates an example of a motion correction table for the appeal mode according to the first embodiment;

FIG. 18 is a flowchart indicating the flow of a delay correction process according to the second embodiment;

FIG. 19 illustrates an example of reaction request information according to the second embodiment;

FIG. 20 illustrates an example of correction possibility information according to the second embodiment; and FIG. 21 illustrates an example of delay correction information according to the second embodiment.

DETAILED DESCRIPTION OF THE PREFERRED EMBODIMENTS

Figure 1:
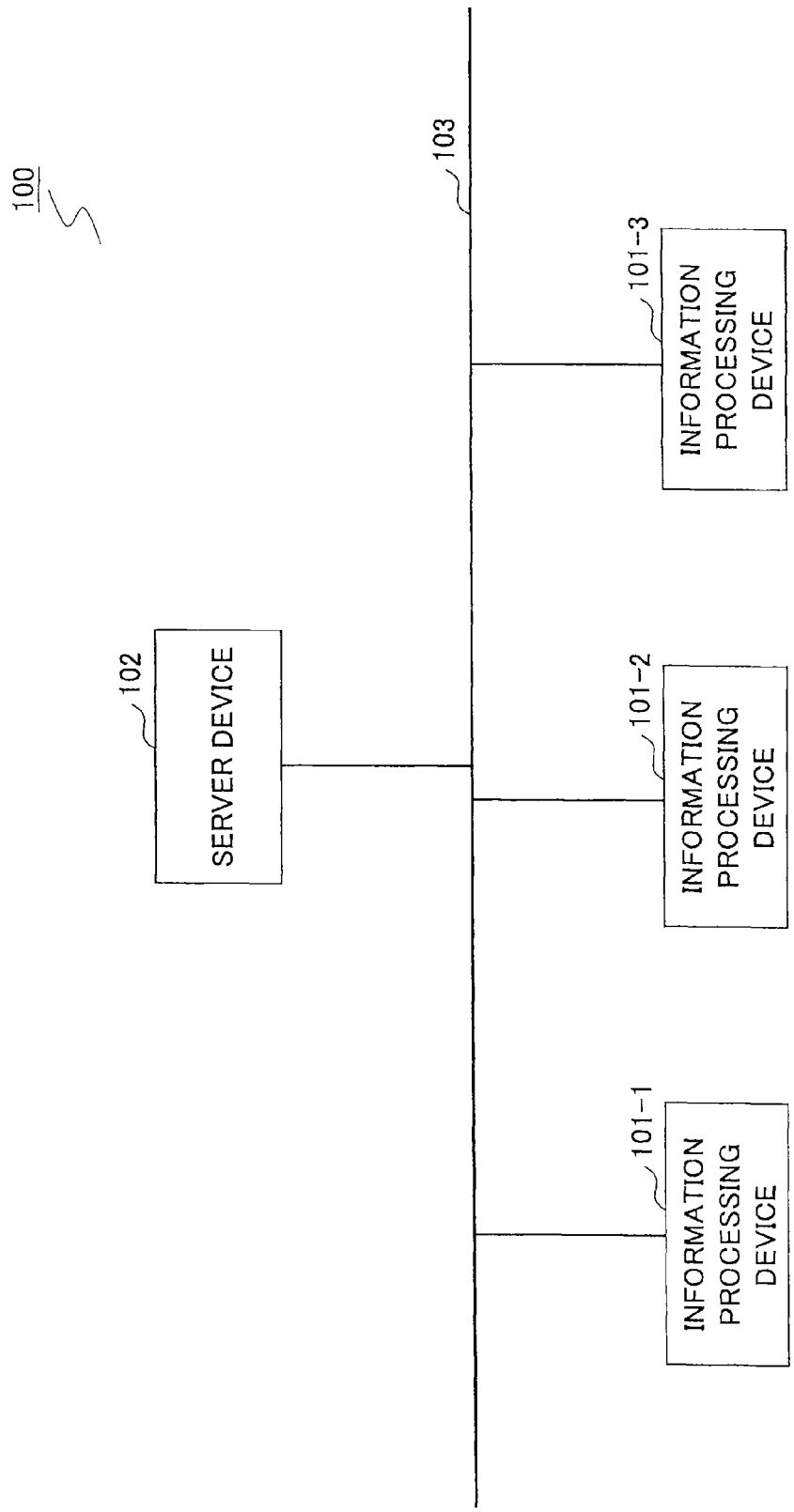
FIG. 1 illustrates an example of an information processing system according to an embodiment.

A description is given, with reference to the accompanying drawings, of embodiments of the present invention.
System Configuration FIG. 1 illustrates an example of an information processing system according to an embodiment. In the system illustrated in FIG. 1, a plurality of devices are connected via a network for performing communication, which is a remote conference system, for example.

In the example of FIG. 1, an information processing system 100 includes a plurality of information processing devices 101-n (n=1 through 3; n being an arbitrary number greater than one) and a server device 102, which are connected via a network 103. The network 103 is a communication network such as the Internet, or a wired or wireless LAN (Local Area Network) in a company, and a WAN (Wide Area Network). Note that the plurality of information processing devices 101-n are described as the information processing device 101 when they do not need to be distinguished from each other.

The information processing device 101 is also referred to as a client terminal, and is a terminal used when holding a remote conference via the network 103. The information processing device 101 is, for example, a PC (Personal Computer), a smartphone, a tablet terminal, and an exclusive-use terminal for remote conferences.

The server device 102 has a function of controlling communication between the plurality of information processing devices 101-n; for example, the server device 102 has a function of receiving data from the information processing device 101-1, and sending the data to intended information processing devices, such as the information processing device 101-2 and the information processing device 101-3. Furthermore, the server device 102 may perform a predetermined data process on data that is transmitted/received between the plurality of information processing devices 101-n, such as image processing, encoding, and decoding.

Note that the above configuration is one example, and the number of server devices 102 may be greater than one. Furthermore, the information processing system 100 may not include the server device 102, and communication may be performed by a peer-to-peer connection between the information processing devices 101.

The information processing devices 101-1 through 101-3 may perform communication between the information processing devices, and transmit/receive information of voices and images. Accordingly, for example, a user of the information processing device 101-1 can have a remote conference with users of the information processing devices 101-2 and 101-3, through voice and image data that are transmitted and received in a real-time manner.

Note that at this time, the displayed images relevant to the user of the communication destination may not necessarily be actual images of the user. For example, an avatar conference may be held, in which instead of using actual image data of the user, only information relevant to motions of the user (motion information) is transmitted/received, and the information processing device 101 generates an object (avatar) of the user based on the received motion information, and displays the object. By an avatar conference, it is possible to hold a remote conference with a communication line having a narrower bandwidth. Furthermore, in an avatar conference, not only voices, but also non-verbal information such as gestures can be transmitted, and therefore communication can be performed more smoothly than a voice conference.

In the present embodiment, in an avatar conference held between a first area (spot) and a second area (spot), for example, the information processing device 101 specifies, from first motion information of a user of a first area, first meaning information indicating a meaning in the first area, and second meaning information indicating a meaning in the second area. Furthermore, when the two specified meaning information items of the two areas do not match; i.e., when it is determined that there is a communication gap, the motion information of the first user is corrected such that the motion information of the first user indicates first meaning information in the second area.

Furthermore, the information processing device 101 has one or more of motion modes, for generating an avatar by emphasizing or suppressing motions relevant to the corrected motion information. Furthermore, the information processing device 101 has a motion mode of generating an avatar by exaggerating the motion by a motion different from the corrected motion information.

Figure 2:
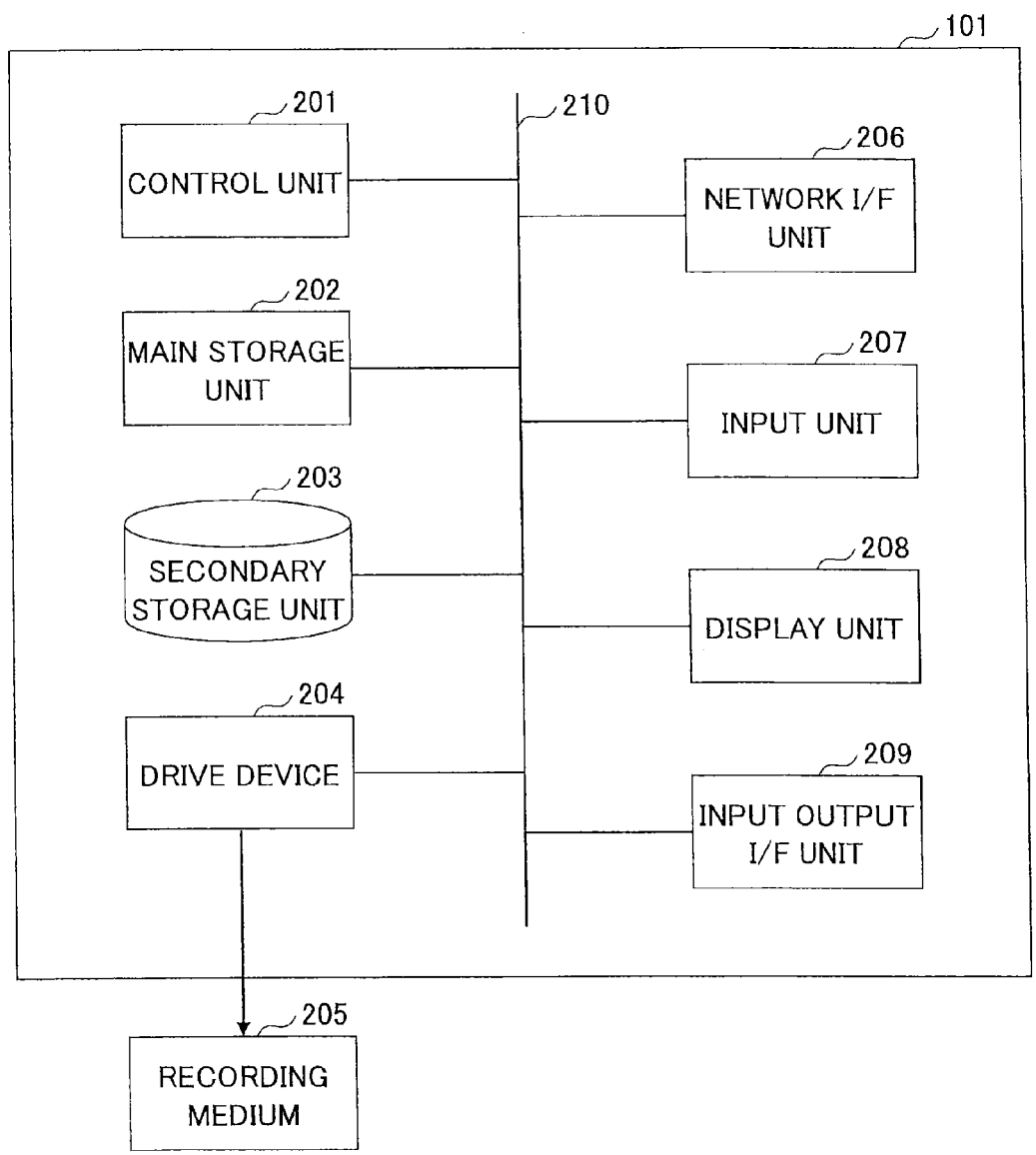
FIG. 2 is an example of a hardware block diagram of an information processing device according to an embodiment.

Note that the above functions may be separately provided in the respective information processing devices 101, or may be provided in a distributed manner across the plurality of information processing devices 101 and the server device 102.
Hardware Configuration FIG. 2 is an example of a hardware block diagram of the information processing device 101 according to an embodiment. The information processing device 101 has a configuration of a typical computer, and includes, for example, a control unit 201, a main storage unit 202, a secondary storage unit 203, a drive device 204, a network I/F (interface) unit 206, an input unit 207, a display unit 208, an input output I/F unit 209, and a system bus 210. Note that the server device 102 may also have the same configuration.

The control unit 201 includes a CPU (Central Processing Unit) for controlling the respective units and performing calculation and processing on data. Furthermore, the control unit 201 is a processing unit for executing communication control programs stored in the main storage unit 202 and the secondary storage unit 203. The control unit 201 receives data from the input unit 207 and the storage devices, performs calculation and processing on data, and outputs the data to the display unit 208 and the storage devices.

The main storage unit 202 is a storage unit such as a ROM (Read Only Memory) and a RAM (Random Access Memory). The main storage unit 202 is a storage device that stores, or temporarily saves, programs executed by the control unit 201 such as an OS (Operating System) that is basic software and application software, and data. The secondary storage unit 203 is a storage unit such as a HDD (Hard Disk Drive) and a SSD (Solid State Drive), and is a storage device for storing data relevant to application software. The drive device 204 reads programs from a recording medium 205 such as a memory card, and installs the programs in the storage device. Furthermore, for example, a communication control program is stored in the recording medium 205, and the communication control program is installed in the information processing device 101 via the drive device 204. The installed communication control program becomes executable by the information processing device 101.

The network I/F unit 206 is a communication unit for transmitting/receiving data via a network such as a LAN and a WAN constructed by a wired and/or a wireless data transmission line. The input unit 207 is an input unit used by a user to input information in the information processing device 101, such as a keyboard for performing key input, a pointing device such as a mouse, and a touch panel. For example, the display unit 208 is a display unit such as a LCD (Liquid Crystal Display), and performs display according to display data input from the control unit 201. Furthermore, the display unit 208 may be provided as a separate body from the information processing device 101; in this case, the information processing device 101 is provided with a display control unit for controlling the display unit The input output I/F unit 209 is a unit for performing input and output of data with respect to an external device. For example, the input output I/F unit 209 includes interfaces between a camera for acquiring an image of a user, a microphone for acquiring the voice data of a user, and a speaker for outputting voice audio of the communication destination. The system bus 210 is an address bus, a data bus, and a bus for transmitting various control signals.

First Embodiment

Functional Configuration

Figure 3:
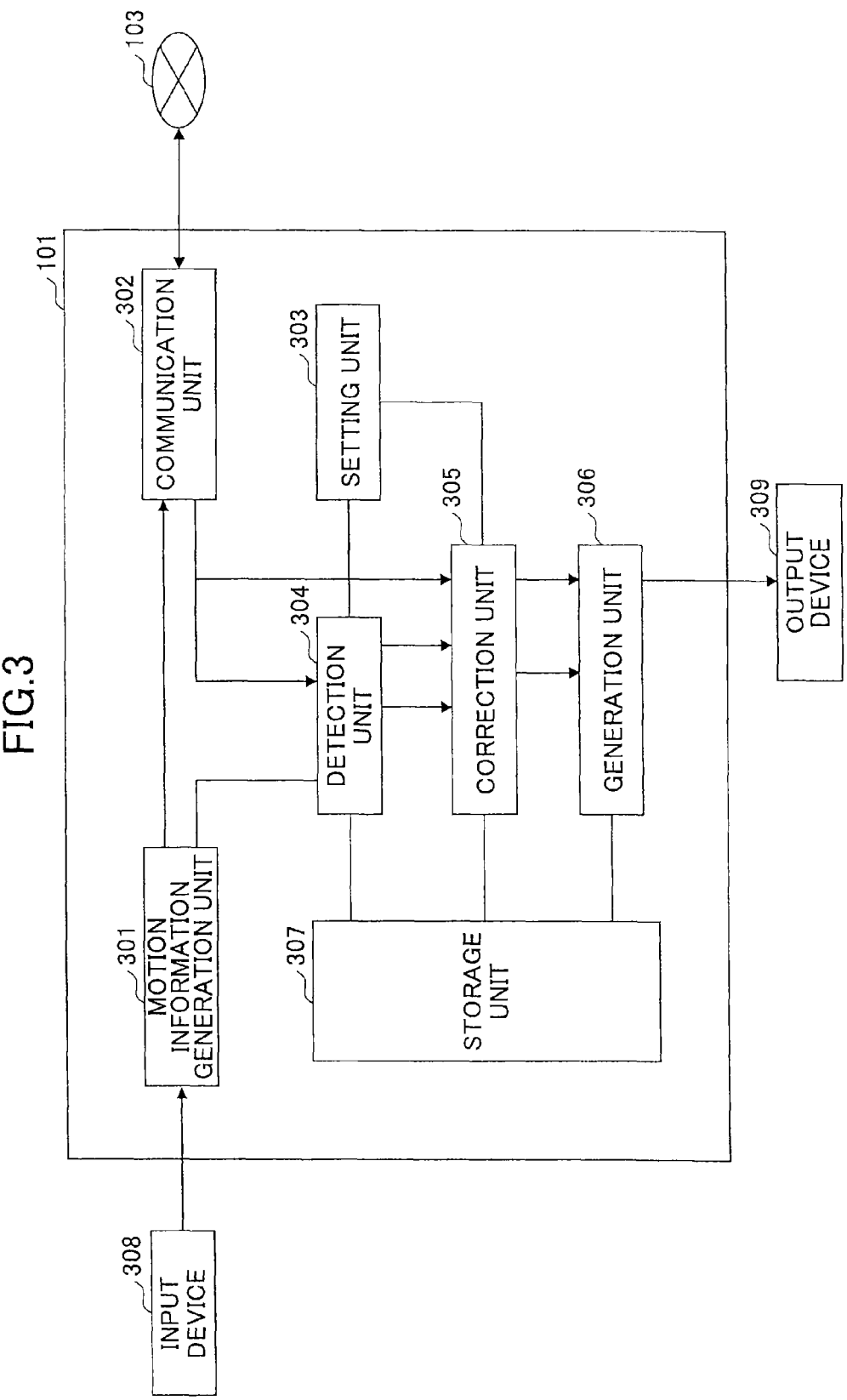
FIG. 3 illustrates a functional configuration of the information processing device according to a first embodiment.

FIG. 3 illustrates a functional configuration of the information processing device 101 according to a first embodiment. In FIG. 3, the information processing device 101 acquires information expressing motions of a user, such as video images and voice data of a user, from an input device 308. The input device 308 is a device that can recognize motions of a user, such as a camera, a depth sensor, and a microphone. Furthermore, the information processing device 101 outputs a generated object to an output device 309. The output device 309 is a device such as the display unit 208 of FIG. 2 and a speaker. An object is an avatar, etc., for expressing the user of the communication destination.

The information processing device 101 illustrated in FIG. 3 includes a motion information generation unit 301, a communication unit 302, a setting unit 303, a detection unit 304, a correction unit 305, a generation unit 306, and a storage unit 307. Note that the motion information generation unit 301, the setting unit 303, the detection unit 304, the correction unit 305, and the generation unit 306 are realized by programs executed at the control unit 201 of FIG. 2, for example. At this time, the main storage unit 202 is used as a work memory. Furthermore, the storage unit 307 is included in a storage unit such as the main storage unit 202 and the secondary storage unit 203 of FIG. 2, for example. The communication unit 302 is realized by the network I/F unit 206, for example.

The motion information generation unit 301 generates information (motion information) indicating what kind of motions the user is performing, including not only motions of the body but also voice sound, based on information expressing the motions of the user acquired from the input device 308. The generated motion information is sent to the information processing device of the communication destination via the communication unit 302.

The communication unit 302 performs transmitting/receiving of data needed for performing communication with another information processing device via the network 103. Here, data needed for performing communication includes, for example, the above motion information. In the present embodiment, the communication unit 302 sends, to the information processing device that is the communication destination, the motion information generated by the motion information generation unit 301, based on information from the input device 308. Furthermore, the communication unit 302 receives (acquires) motion information of the user of the communication destination, from the information processing device of the communication destination.

For example, in the case of an object (avatar) constituted by a 3D model, the motion information is, for example, quaternion information including coordinates of the base with respect to each object, the orientation of the object expressed by three dimensions X, Y, Z, and the rotation angle. With this quaternion information, it is possible to uniquely define the mode of the object, and therefore the quaternion information of the respective frames is to be transmitted/received. In this case, the information of the 3D model is prepared by sharing information in advance or by having the user procure information on his/her own.

However, facial expressions may appear to be unnatural if images are formed from position information. This is because as it is generally seen in animations, motions that accompany expressions of an object that are not realistic may not necessarily be the same as the motions performed by an actual human being for conveying the same intention. Thus, the information processing device 101 may determine the expression by a method as described in Japanese Patent No. 3593067, send information indicating the type of expression (delight, anger, sorrow and pleasure), and apply this expression to the model used at the receiving side.

The setting unit 303 is a unit for making various settings relevant to motions, in the information processing device 101. The information processing device 101 includes a plurality of background setting tables indicating the meanings of the respective motion information items acquired from the communication unit 302, according to cultural backgrounds such as the language, the country, the area, the ethnic group, and customs. This is because the same motion may have different meanings if the cultural backgrounds are different. The setting unit 303 is a unit for setting a table (first table) according to the cultural background of the communication destination (first spot) and a table (second table) according to the cultural background of the communication source (second spot), from among the background setting tables. Furthermore, this setting is referred to as a background setting.

Furthermore, the information processing device 101 according to the present embodiment includes a plurality of motion modes, including an emphasizing mode of emphasizing the expression of the object, a moderate mode of suppressing the expression of the object, and an appeal mode of exaggerating the expression of the object. The setting unit 303 is also a unit for selecting a single motion mode from the plurality of motion modes. Furthermore, this setting is referred to as a mode setting.

For example, the user of the information processing device 101 may operate a screen displayed by the setting unit 303 on the display unit 208 and the input unit 207 of FIG. 2, to make settings such as the above-described background setting and the mode setting.

Furthermore, in another preferred example, the information processing device 101 may acquire information such as the area, the language, and the time zone of the communication destination, from the information processing device of the communication destination, and set a background setting table (first table) of the communication destination, based on the acquired information. In this case, even if the cultural background of the communication destination is not sufficiently known, the background setting is appropriately made automatically.

The detection unit 304 detects (specifies) first meaning information indicating the meaning of the motion information at the first spot, based on the background setting table corresponding to the first spot, from the motion information of the user of the information processing device of the communication destination (first spot) acquired by the communication unit 302. Furthermore, the detection unit 304 detects (specifies) second meaning information indicating the meaning of the motion information at the second spot, based on the background setting table corresponding to the second spot. For example, the detection unit 304 determines whether the motion information acquired by the communication unit 302 matches the motion information of the background setting table, and specifies the meaning corresponding to the matching motion information. For example, the detection unit 304 outputs the meaning information indicating the specified meaning, by attaching the meaning information to the motion information. Note that a description is given of an example where the first meaning information and the second meaning information are detected by a single detection unit 304; however, there may be two detection units for separately detecting the first meaning information and the second meaning information.

The correction unit 305 corrects the above motion information such that the motion information indicates the above first meaning information at the communication source (second spot), based on the difference between the first meaning information and the second meaning information specified by the detection unit 304. When a table corresponding to the cultural background of the communication destination is correctly set as the background setting table corresponding to the first spot, the first meaning information indicates the meaning of the motion information of the user at the communication destination. Furthermore, similarly, when a table corresponding to the cultural background of the communication source is correctly set as the background setting table corresponding to the second spot, the second meaning information indicates the meaning of the motion information of the user at the communication source.

Accordingly, when the first meaning information and the second meaning information do not match, and the motion information is transmitted without being modified, it can be determined that a communication gap will occur. Thus, the correction unit 305 corrects the motion information acquired from the communication destination, when the first meaning information and the second meaning information do not match.

Furthermore, the correction unit 305 corrects the corrected motion information, according to the motion mode set by the mode setting. Note that specific contents of the correction performed by the correction unit 305 are described below.

The generation unit 306 generates an object (avatar) of a user of the information processing device of the communication destination, based on the motion information corrected by the correction unit 305, and outputs the generated object to the output device 309. The information needed for generating an object to be displayed on the output device 309 may be saved in the information processing device 101 in advance, or may be provided from the device of the other party when the conference starts.

Here, a description is given of a background setting table. The background setting table includes a plurality of tables indicating the meaning of each motion information item, according to cultural backgrounds such as the language, the country, the area, the ethnic group, and customs.

Figure 4:
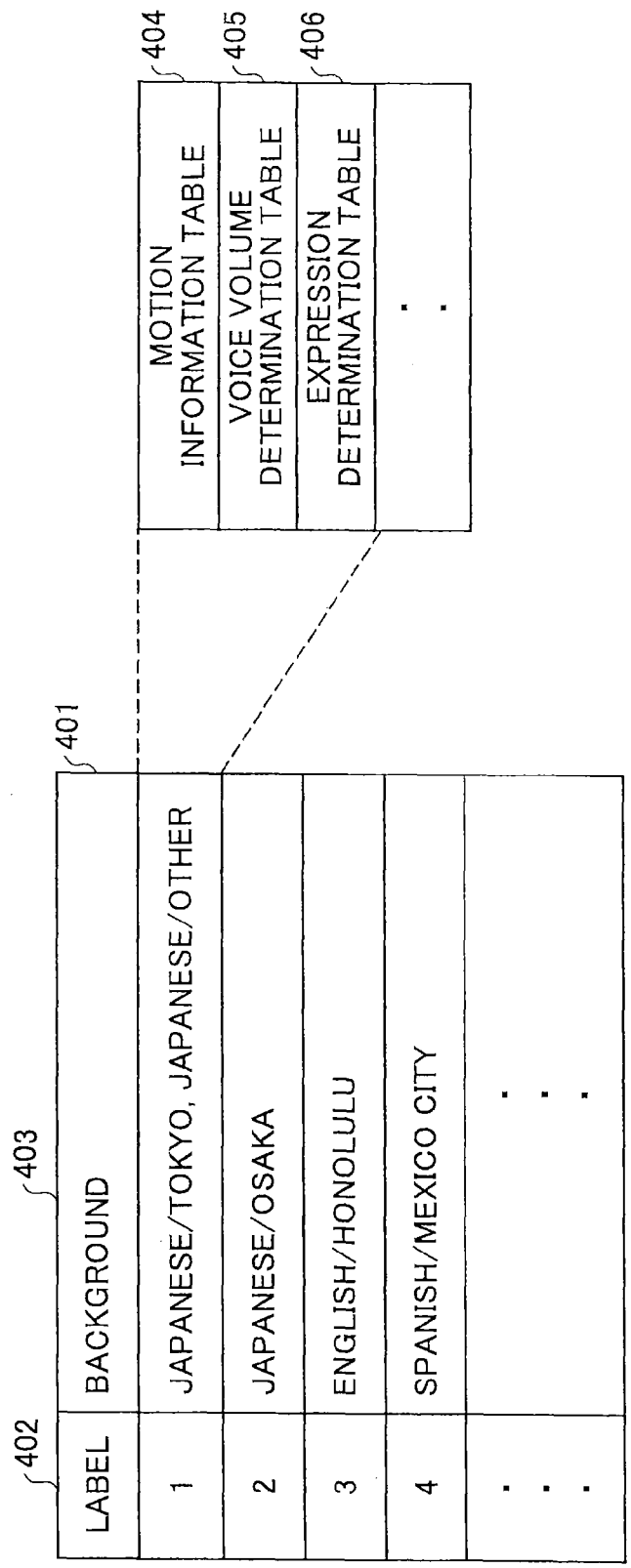
FIG. 4 illustrates an example of a background setting table according to the first embodiment.

FIG. 4 illustrates an example of a background setting table according to the first embodiment. In a background setting table 401, a plurality of tables corresponding to cultural backgrounds are prepared, and each table is denoted by a label 402 for identification. Furthermore, the background setting table 401 is constituted such that the user can select an appropriate table, according to a background 403, which is, for example, the language, the country, the city, the area, the ethnic group, the religion, or a combination of these backgrounds.

Furthermore, each table in the background setting table 401 may further include a plurality of tables such as a motion information table 404, a voice volume determination table 405, and an expression determination table 406.

FIG. 5 illustrates an example of a motion information table according to the first embodiment. In a motion information table 404 illustrated in FIG. 5, a label 501, a motion type 502, a standard of motion information 503, and a meaning of motion information 504, are associated with each other. When the acquired motion information matches or corresponds to the standard of motion information 503 of the motion information, the detection unit 304 can specify the meaning of motion information 504 corresponding to the matching or corresponding motion information.

FIG. 6 illustrates an example of the voice volume determination table 405 according to the first embodiment. Similar to the motion information table 404, in the voice volume determination table 405 illustrated in FIG. 6, a label 601, a motion type 602, a standard of motion information 603, and a meaning of motion information 604, are associated with each other. While the motion information table 404 is a table mainly relevant to body motions of a user, the voice volume determination table 405 is a table mainly relevant to the voice. When the voice information of the acquired motion information matches or corresponds to the standard of motion information 603, the detection unit 304 can specify the meaning of motion information 604 corresponding to the matching or corresponding motion information.

Furthermore, the background setting table 401 may include the expression determination table 406 for detecting the expression of the user.

FIG. 7 illustrates an example of the expression determination table 406 according to the first embodiment. In the expression determination table 406 illustrated in FIG. 7, a label 701, a type of expression 702, a standard of motion information 703, and a meaning of motion information 704, are associated with each other. By the expression determination table 406, it is possible to specify the meaning of an expression, which cannot be read only from motions of the upper body of the user and voice sound. When the acquired motion information matches or corresponds to the standard of motion information 703, the detection unit 304 can specify the meaning of motion information 704 and the type of expression 702 corresponding to the matching or corresponding motion information.

For example, the detection unit 304 outputs, to the correction unit 305 as meaning information, the meanings of the motion information 504, 604, 704, which have been specified based on the motion information table 404 and the expression determination table 406.

Flow of Process

Next, a description is given of the flow of the process of the information processing device 101.

FIG. 8 is a flowchart indicating the flow of the process of the information processing device 101 according to the first embodiment. Note that in FIG. 8, it is assumed that before starting communication, a first table corresponding to the cultural background of the first spot and a second table corresponding to the cultural background of the second spot are already set, from a plurality of background setting tables, according to the background setting.

When communication is started between the information processing device of the first spot (communication destination) and the information processing device of the second spot (communication source) (step S801), the communication unit 302 acquires the motion information of the user of the information processing device of the first spot sent from the communication destination (step S802). Next, the detection unit 304 uses the first table set by the background setting, to detect first meaning information that is information indicating the meaning at the first spot of the motion information acquired by the communication unit 302. Furthermore, the detection unit 304 uses the second table set by the background setting, to detect second meaning information that is information indicating the meaning at the second spot of the motion information acquired by the communication unit 302 (step S803).

Next, the correction unit 305 determines whether the first meaning information and the second meaning information match (step S804). When the first meaning information and the second meaning information do not match, the correction unit 305 corrects the motion information of the user of the communication destination (step S805). On the other hand, when the first meaning information and the second meaning information match, the process proceeds to step S806 without correcting the motion information. Furthermore, the correction unit 305 corrects the motion information according to the motion mode set by the setting unit 303 (step S806).

The generation unit 306 generates an object (avatar) of the user of the information processing device of the communication destination, based on the motion information acquired from the correction unit 305 (step S807).

Correction Process

Here, a description is given of a correction process by the correction unit 305.

FIG. 9 illustrates a configuration of the correction unit 305 according to the first embodiment. For example, the correction unit 305 includes a determination unit 901, a first correction unit 902, and a second correction unit 903. Furthermore, in the storage unit 307, a background setting table and a correction content table are stored.

In the determination unit 901, the first meaning information and the second meaning information are input, which have been detected by the detection unit 304. The determination unit 901 compares the input first meaning information and the second meaning information, and when these two meanings do not match, the determination unit 901 instructs the first correction unit 902 to correct the motion information of the user of the first spot input from the communication unit 302. The determination unit 901 determines the correction contents by the first correction unit 902. Note that the configuration where the determination unit 901 determines the correction contents is one example; the correction contents of the motion information may be determined by the first correction unit 902.

The first correction unit 902 corrects the motion information of the user of the information processing device of the first spot, according to instructions for correction from the determination unit 901. Specifically, the first correction unit 902 corrects the motion information of the user of the information processing device of the first spot, such that the motion information of the user of the first spot indicates the first meaning information at the second spot.

According to the motion mode set by the setting unit 303, the second correction unit 903 corrects the motion information output from the first correction unit 902, and outputs the corrected motion information to the generation unit 306.

Figure 10:
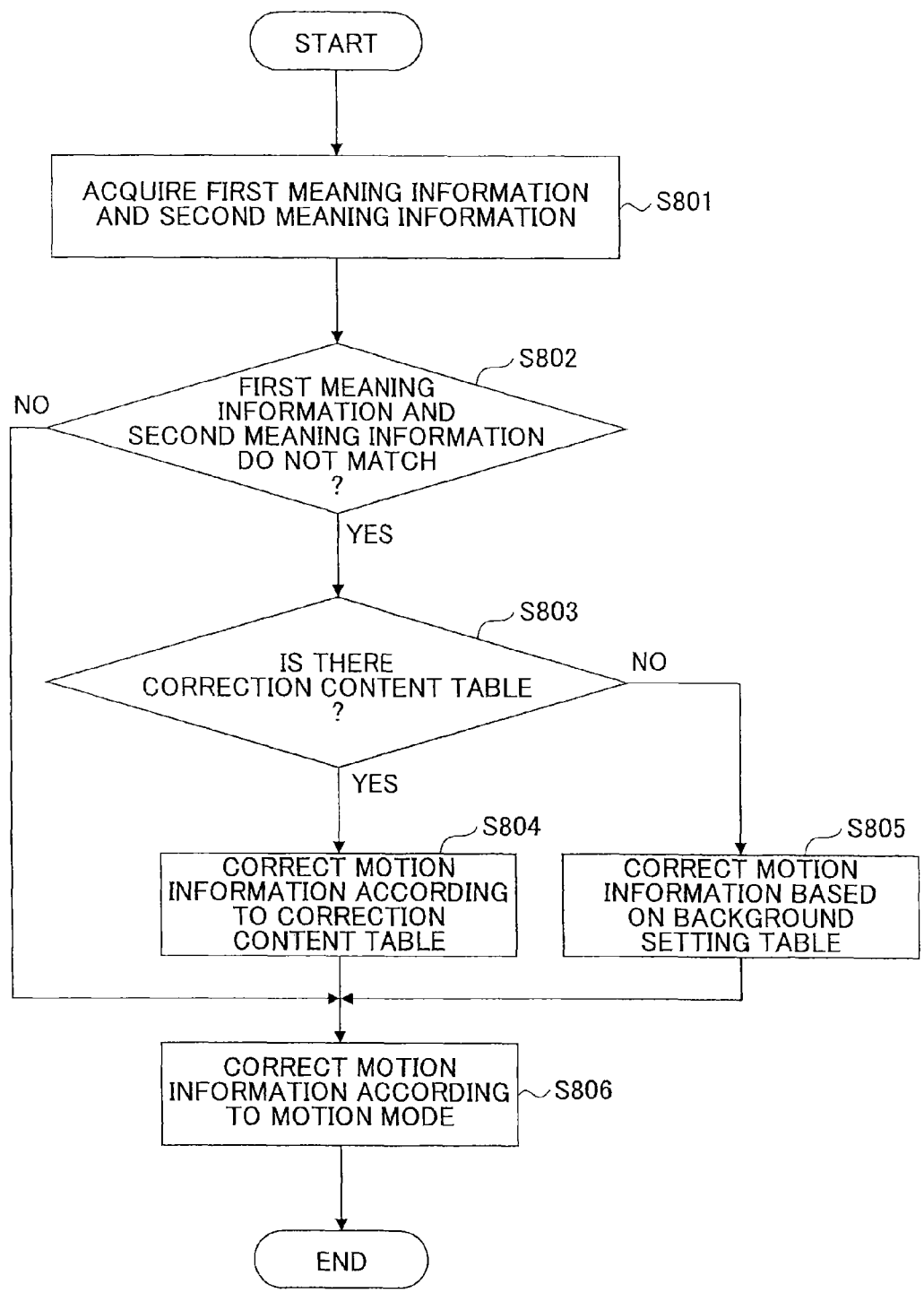
FIG. 10 is a flowchart indicating a flow of a correction process according to the first embodiment.

FIG. 10 is a flowchart indicating a flow of a correction process according to the first embodiment. The determination unit 901 acquires the first meaning information and the second meaning information output from the detection unit 304 (step S801). The determination unit 901 determines whether the first meaning information and the second meaning information match (step S802). When the first meaning information and the second meaning information match, it is considered that there is no communication gap between the first point of the communication destination and the second point of the communication source. Therefore, the correction unit 305 does not need to correct the motion information acquired from the communication unit 302.

On the other hand, in step S802, when the first meaning information and the second meaning information do not match, it is considered that there is a communication gap between the first point of the communication destination and the second point of the communication source. In this case, the first correction unit 902 determines whether there is a correction content table (step S803). When there is a correction content table, the first correction unit 902 corrects the motion information according to the correction content table (step S804).

On the other hand, in step S803, when there is no correction content table, the motion information is corrected based on the background setting table corresponding to the first point and/or the background setting table corresponding to the second point, set by the background setting (step S805). The second correction unit 903 corrects the corrected motion information according to the motion mode.

Specific examples of the correction contents of the first correction unit 902 are described.

FIG. 11 illustrates an example of a background setting (excerpt) according to the first embodiment. FIG. 11 illustrates an excerpted motion (nodding with voice) of part of a background setting table. Furthermore, as a first table, label 1 (Japanese/Tokyo, Japanese/other) of the background setting table of FIG. 4 is set, and as a second table, label 4 (Spanish/Mexico City) is set.

In this case, when the user of a first spot of the communication destination performs a nodding motion of tilting his face forward by 8 degrees, in the first table, the standard of the motion information is the face "is tilted forward by 5 degrees or more", and therefore the first meaning information is "affirmative". Meanwhile, in the second table, the standard of the motion information is the face "is tilted forward by 10 degrees or more", and therefore the second meaning information is not "affirmative", and therefore the two meaning information items do not match.

In this case, the first correction unit 902 confirms whether a correction content table corresponding to the first table and the second table is stored in the storage unit 307.

FIG. 12 illustrates an example of a correction content table according to the first embodiment. In FIG. 12, with respect to a label A-1.1, according to a combination of a first table 1201 and a second table 1202, a correction content 1203 is defined. In the example of FIG. 11, the first table is label 1 and the second table is label 4, and therefore according to the correction content table of FIG. 12, a correction is made to increase the motion of the face by 50%.

In the above example, the user is tilting his face forward by 8 degrees, and therefore the correction unit 305 corrects the motion to tilting the face forward by 12 degrees, based on the correction content table. Note that in the correction content table, correction contents as illustrated in FIG. 12 are respectively recorded in association with the motion types and labels. Furthermore, the correction content table is created such that the motion information indicates the same meaning as the first spot at the second spot, by making corrections according to the correction content table.

On the other hand, when there is no correction content table, the correction unit 305 corrects the motion information based on the first table and/or the second table set in the background setting. In the example of FIG. 11, it is known from the second table that, by making the face tilt forward by 10 degrees or more, the meaning of the motion information also becomes "affirmative" at the second spot. Therefore, the correction unit 305 makes a correction such that the face tilts forward by 10 degrees or more. For example, by setting the ratio to be 120% with respect to the threshold of 10 degrees, a correction is made to make the face tilt forward by 12 degrees. Note that by increasing or decreasing this ratio, it is possible to emphasize or suppress the motion of the avatar of the user of the communication destination.

Furthermore, the motions of a human being may vary even for a motion of the same meaning, and therefore, if the same correction is made every time for the same input (first meaning information and second meaning information), the motions of the avatar may appear unnatural. Therefore, a plurality of correction contents may be prepared for the first meaning information and second meaning information, and the process content may be randomly selected. Note that the plurality of correction contents may include different correction contents or correction contents of different timings. The correction unit 305 outputs the motion information that has been corrected, to the generation unit 306.

Motion Mode

Next, a description is given of a motion mode of the information processing device 101. The information processing device 101 includes a plurality of motion modes for expressing the motion information, for which the communication gap has been corrected by the first correction unit 902, in an emphasized, suppressed, or exaggerated manner.

Figure 13:
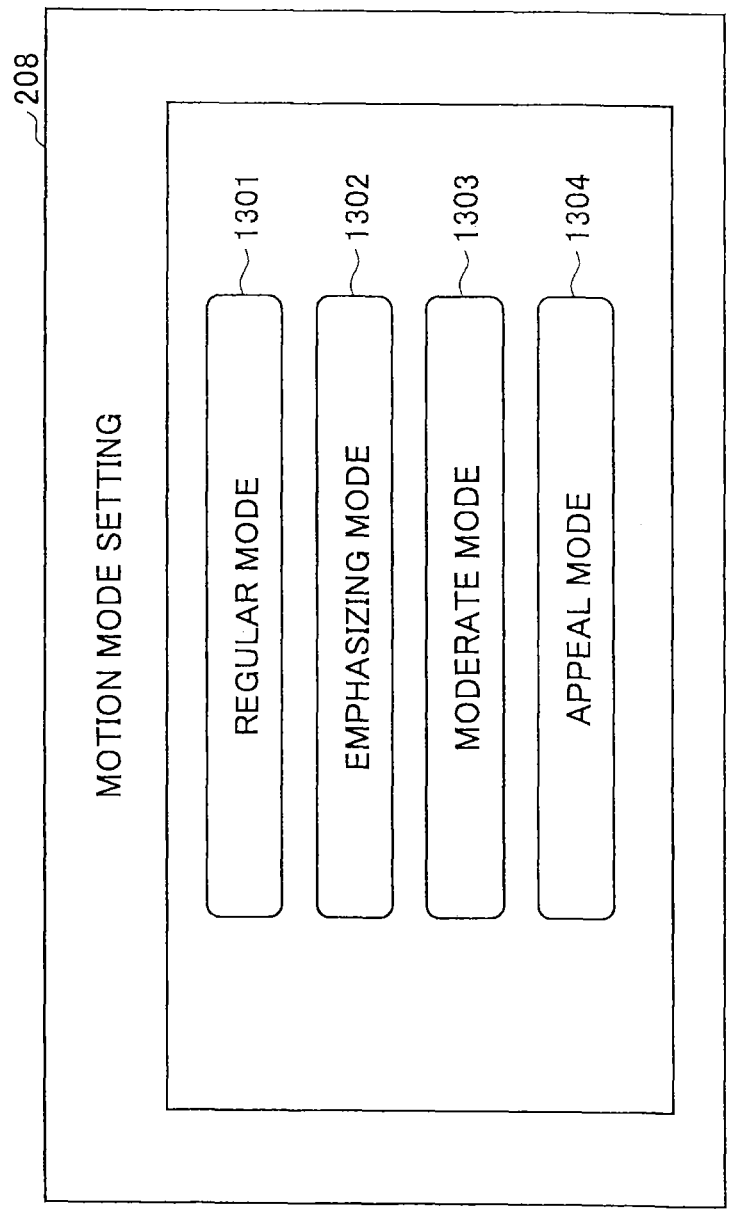
FIG. 13 illustrates an example of a motion mode setting screen according to the first embodiment.

FIG. 13 illustrates an example of a motion mode setting screen according to the first embodiment. In the example of FIG. 13, for example, the setting unit 303 displays, on the display unit 208 of FIG. 2, a motion mode setting screen including a regular mode 1301, an emphasizing mode 1302, a moderate mode 1303, and an appeal mode 1304. The above four motion modes are examples; the number of motion modes may be other than four. The user can select the motion mode of the information processing device 101 from the motion mode setting screen.

Among the four modes illustrated in FIG. 13, the regular mode 1301 is a motion mode for making a correction by the first correction unit 902 to eliminate the communication gap between motion information items, and for not making any additional corrections by the second correction unit 903.

The emphasizing mode 1302 is a mode for making a correction to increase the motion relevant to the motion information acquired from the first correction unit 902, and generating an object of the user of the communication destination based on the correction. In this motion mode, for example, in the case of a nodding motion, the second correction unit 903 makes a correction to increase the nodding angle. For example, the information processing device 101 may include a correction table for the emphasizing mode associated with the background setting, and the second correction unit 903 may correct the motion information according to this correction table for the emphasizing mode. The second correction unit 903 may simply make a correction to increase the target motion, without using a correction table. The generation unit 306 generates an object of the user of the communication destination, based on the corrected motion information.

The moderate mode 1303 is a motion mode for making a correction to decrease the motion relevant to the motion information acquired from the first correction unit 902, and generating an object of the user of the communication destination based on the correction. For example, the second correction unit 903 makes a correction to decrease the nodding angle in the case of a nodding motion. Similar to the emphasizing mode, the information processing device 101 may include a correction table for the moderate mode, and the second correction unit 903 may correct the motion information according to this correction table for the moderate mode. Alternatively, the second correction unit 903 may simply make a correction to decrease the target motion, without using a correction table. The generation unit 306 generates an object of the user of the communication destination, based on the corrected motion information.

The appeal mode 1304 is a mode for making a correction to exaggerate the motion relevant to the motion information acquired from the first correction unit 902, and generating an object of the user of the communication destination based on the correction. The appeal mode 1304 does not only increase the motion of the user of the communication destination, but also makes a correction of, for example, increasing the size of the face of the object of the user of the communication destination, or making the object approach the viewer, when the voice level of the user of the communication destination suddenly increases. Furthermore, when there are continuously no voices or motions of the user of the communication destination, the object of the user of the communication destination may become pale (change transparency). Furthermore, when the voice level of the communication destination is continuously high, a correction may be made to change the color of the face of the object of the user of the communication destination to a red color (change color of object).

That is to say, in the appeal mode 1304, the motion relevant to the motion information of the user of the communication destination is exaggerated, by using a different motion. In this case, the motion of the object of the user of the communication destination is allowed to be a motion that is impossible or difficult for an actual human being.

Note that in the appeal mode 1304, the motion information of the object of the user of the communication destination may be changed, according to the voice level of the communication source. For example, when a loud voice sound is suddenly generated at the communication source, a correction may be made to change the shapes of the eyes of the object of the user of the communication destination, to "><" (change shape of object).

FIG. 14 illustrates an example of a motion correction table for the appeal mode according to the first embodiment. In the example of FIG. 14, in the motion correction table for the appeal mode, a motion/meaning 1401, a correction motion 1402, and a correction execution probability 1403, are associated with each other. For example, the second correction unit 903 specifies the motion/meaning 1401 of FIG. 14 according to first meaning information acquired from the detection unit 304. The second correction unit 903 corrects the motion information according to the correction motion 1402 corresponding to the specified motion/meaning 1401.

Note that as illustrated in FIG. 14, there may be set a plurality of the correction motions 1402 corresponding to a single motion/meaning 1401. For example, when the motion/meaning 1401 of the user of the communication destination is "affirmative", it is rather unnatural if the object of the user jumps up every time the user of the communication destination nods. Therefore, the information processing device 101 may prepare a plurality of correction motions 1402 according to a single motion/meaning 1401, and may randomly select a correction motion 1402 and generate an object. Furthermore, a correction execution probability 1403 may be defined for each correction motion 1402, and the motion information may be corrected based on the correction execution probability 1403 and an object may be generated based on the correction.

As described above, in the appeal mode, the motion of the user of the communication destination is deformed, so that non-verbal information is expressed by a more easily comprehensible motion.

Next, a description is given of a preferred example mainly relevant to the moderate mode. In the moderate mode, a motion correction table may be provided similar to the appeal mode; however, usually, a correction of simply decreasing the motion relevant to the motion information will suffice. However, it is necessary to make sure that the meaning information of the motion does not change as a result of decreasing the motion.

For example, referring back to FIG. 11, as described above, when the face of the user of the communication destination is tilted forward by 8 degrees, this is determined as "affirmative" in the first table, but is not determined as "affirmative" in the second table. In this case, in the above description, the correction unit 305 corrects the motion information of the user of the communication destination such that the face is tilted forward by 12 degrees, based on the motion correction table or the background setting table. Meanwhile, if the forward tilting of 12 degrees is simply decreased by 30%, the forward tilting becomes 9 degrees, which may cause the problem of not being determined as "affirmative" at the second spot again.

In order to resolve such a problem, a correction may be made within a range such that does not change the meaning information, when decreasing the motion in the moderate mode. For example, in the above example of FIG. 11, the forward tilting of the face of 10 degrees is the lower limit of being determined as "affirmative" by the second table, and therefore the correction by the moderate mode is performed within a range such that the forward tilting of the face does not become less than 10 degrees. Alternatively, in the moderate mode, the correction may be made by simply setting the angle to the lower limit value of being determined as "affirmative" by the second table.

Similarly, in the emphasizing mode, a limit may be set to make a correction within a range such that the meaning of the motion does not change as a result of increasing the motion.

Summary (First Embodiment)

As described above, according to the present embodiment, it is possible to provide an information processing device that reduces the communication gap caused by different cultures, and that facilitates communications with a remote location, in communications performed via the network.

In the present embodiment, according to motion information of a communication destination, the meaning information of a communication destination and the meaning information of a communication source are specified, and when the specified two meaning information items do not match, the motion information of the communication destination is corrected, and therefore the communication gap is reduced.

Furthermore, the object of the user of the communication destination is generated according to the corrected motion information and the motion mode, and therefore communications with a remote location are facilitated.

Furthermore, as the motion mode, there is an appeal mode of exaggerating the motion relevant to the corrected motion information by a different motion, and therefore communications with a remote location are further facilitated.

Furthermore, it is possible to select a plurality of motion modes such as a moderate mode and an emphasizing mode, and therefore it is possible to select a preferable mode according to the circumstance, such as communications in a business scene or communications with friends.

Note that the above configuration is one example, and does not limit the scope of the present invention. For example, the information processing device 101 is described as performing various processes of detecting, correcting, and generating at the receiving side; however, the same processes may be performed at the sending side. Furthermore, when communicating with a general-purpose device that does not include functions of embodiments of the present invention, the same processes may be performed at both the sending side and the receiving side. Furthermore, at least part of the setting unit 303, the detection unit 304, the correction unit 305, and the generation unit 306 may be included in the server device 102.

Figure 15:
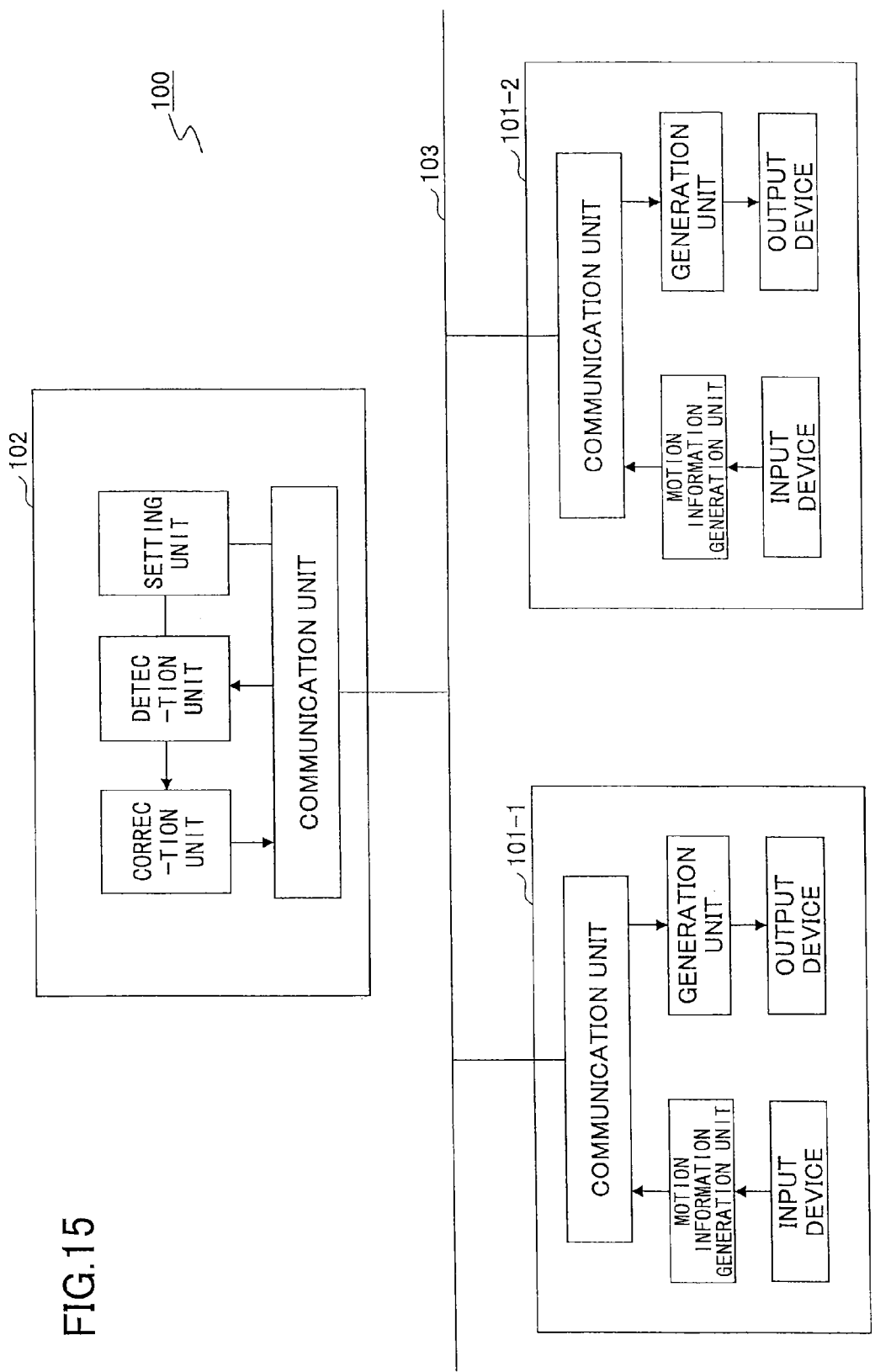
FIG. 15 illustrates another example of the functional configuration of the information processing system.

FIG. 15 illustrates another example of the functional configuration of the information processing system 100. In the example of FIG. 15, the server device 102 includes a setting unit, a detection unit, and a correction unit. Furthermore, the information processing devices 101-1 and 101-2 perform communication via the server device 102. The server device 102 sets background setting tables of a first spot where the information processing device 101-1 is located and a second spot where the information processing device 101-2 is located, and corrects the bidirectional motion information between the information processing device 101-1 and the information processing device 101-2. For example, as described above, the present embodiment may have various system configurations according to the purpose and the objective.

Second Embodiment

Figure 16:
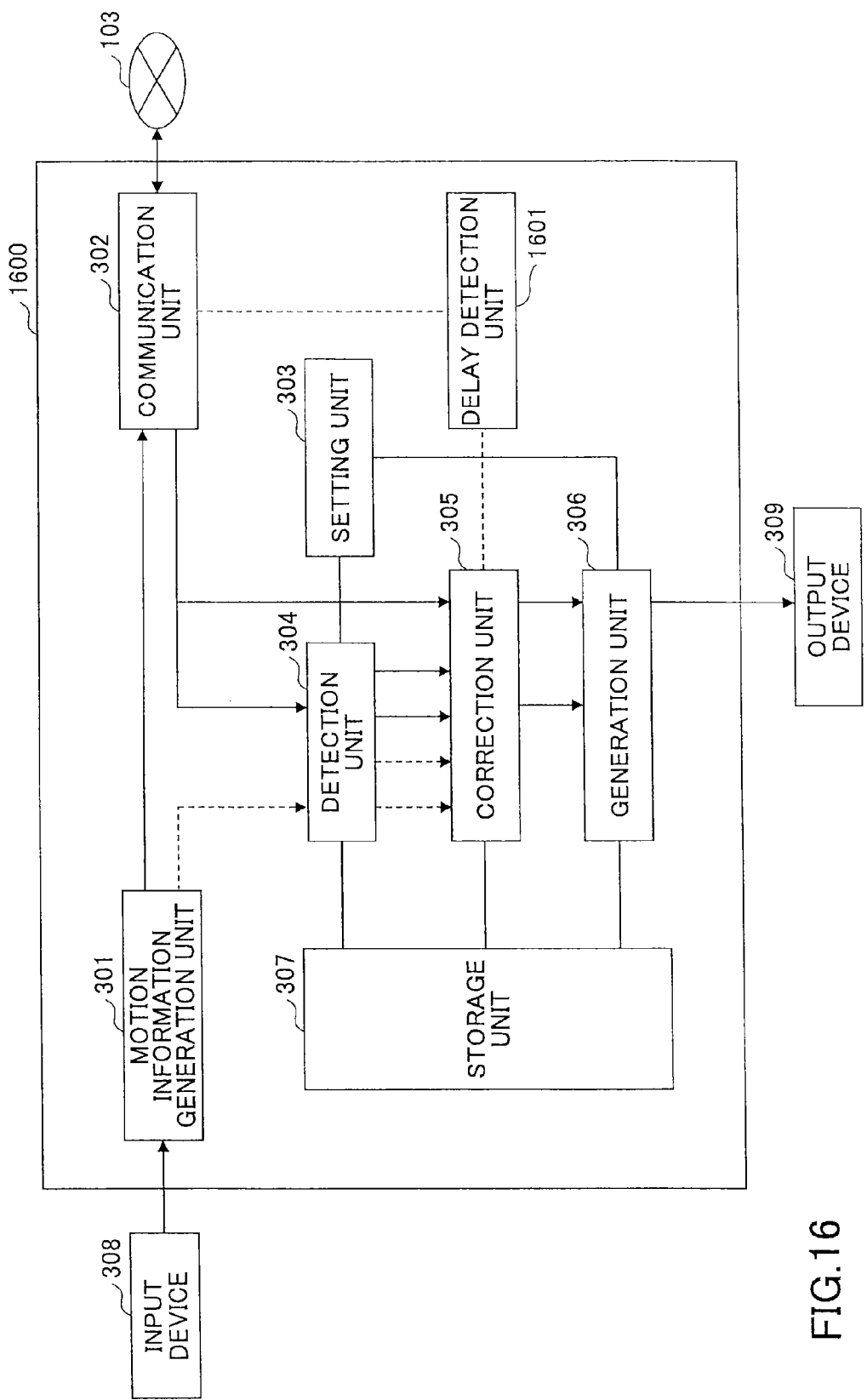
FIG. 16 illustrates an example of a functional configuration of an information processing device according to a second embodiment.

FIG. 16 illustrates an example of a functional configuration of an information processing device 1600 according to a second embodiment. In the information processing device 1600 according to the present embodiment, a delay detection unit 1601 is added to the functional configuration of the information processing device 101 according to the first embodiment illustrated in FIG. 3. Furthermore, some functions of the detection unit 304 and the correction unit 305 are added. In the following, the differences between the information processing device 1600 according to the present embodiment and the information processing device 101 according to the first embodiment are mainly described.

The delay detection unit 1601 is a unit for detecting a communication delay between the communication destination (first spot) and the communication source (second spot); for example, the delay detection unit 1601 is realized by a program operating in the control unit 201 of FIG. 2. For example, the delay detection unit 1601 may measure the communication delay by executing ping to the communication destination and measuring the response time to measure the communication delay. The delay detection unit 1601 outputs the measured communication delay to the correction unit 305.

Furthermore, in the detection unit 304, the motion information of the user of the communication source (second motion information) generated by the motion information generation unit 301 is input, in addition to the motion information of the user of the communication destination acquired by the communication unit 302. In addition to the operations described in the first embodiment, the detection unit 304 uses the motion information table of FIG. 5, to specify a first motion type corresponding to the motion information of the user of the communication destination and a second motion type corresponding to the motion information of the user of the communication source.

As the motion information table used in this case, a table corresponding to the cultural background of the communication source (second spot) may be used, which is set by the background setting described in the first embodiment. Furthermore, a separate setting may be made. The detection unit 304 outputs the specified first motion type and second motion type to the correction unit 305. Note that in the above description, the detection unit 304 specifies the first motion type and second motion type; however, it is needless to say that a second detection unit may be separately provided for performing the above detection.

In the correction unit 305, in addition to the first meaning information and the second meaning information described in the first embodiment, the first motion type and the second motion type described above are input.

Incidentally, the processes of the detection unit 304 and the correction unit 305 require a certain amount of time, as is made obvious by referring to the standard of motion information 603 of the voice volume determination table of FIG. 6, for example. Therefore, for example, the correction unit 305 may perform the correction process after a predetermined delay time, such as until necessary information is received from the detection unit 304.

Note that due to this predetermined delay time and a communication delay with respect to the communication destination, there are cases where speeches collide or cases where there is silence, during the communication with the communication destination. Therefore, in the present embodiment, the correction unit 305 makes a correction of compensating for the delay caused by the above predetermined delay time and the communication delay, based on the first motion type and the second motion type acquired from the detection unit 304, in addition to correcting the motion information according to the first embodiment.

Figure 17:
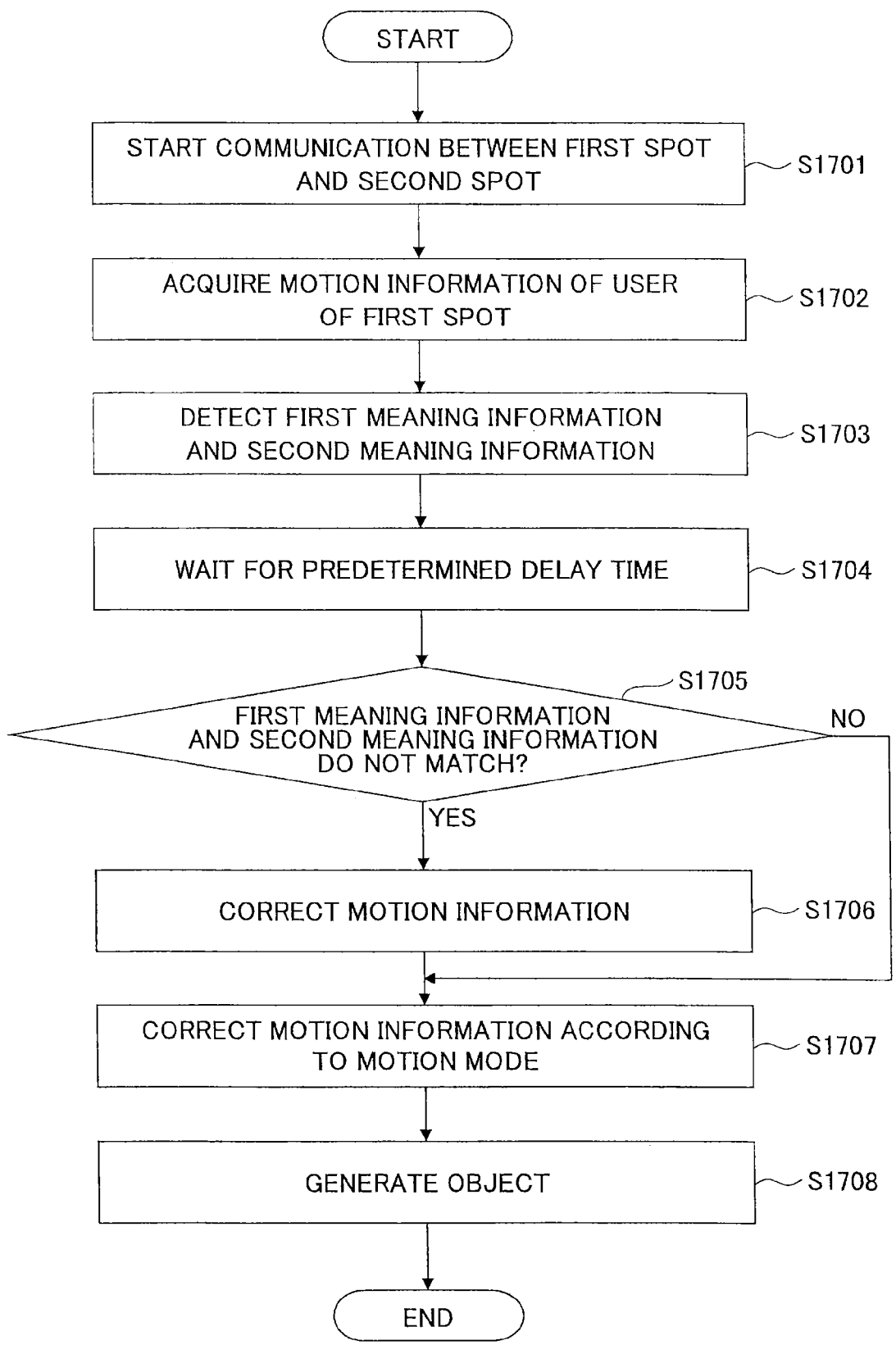
FIG. 17 is a flowchart indicating the flow of a correction process according to the second embodiment.

FIG. 17 is a flowchart indicating the flow of a correction process according to the second embodiment. The step of waiting for a predetermined delay time (step S1704) is added to the flowchart of the first embodiment illustrated in FIG. 8. Furthermore, in the present embodiment, a delay correction process of compensating for the delay caused by the above predetermined delay time and the communication delay, is performed in parallel.

FIG. 18 is a flowchart indicating the flow of a delay correction process according to the second embodiment. When communication is started between the communication destination and the communication source (step S1801), the detection unit 304 acquires motion information of the user of the communication destination from the communication unit 302, and acquires motion information of the user of the communication source from the motion information generation unit 301 (step S1802). The detection unit 304 uses a predetermined motion information table and specifies the first motion type of the user of the communication destination and the second motion type of the user of the communication source (step S1803). The correction unit 305 determines whether the motion of the user of the communication source is a reaction request motion, based on the detected second motion type (step S1804). A reaction request motion is a change in the motion expressing that the user is expecting a reaction.

FIG. 19 illustrates an example of reaction request information according to the second embodiment. For example, as indicated by a request motion label D-1 in FIG. 19, when a speaking user's motion changes when the user is not speaking, it is considered that the user is expecting a reaction of the user of the communication destination. In the table of reaction request information, such a motion of expecting the reaction of a user of a communication destination is associated with a request motion label.

The correction unit 305 determines whether the motion of the user of the communication source is a reaction request motion, based on this table of reaction request information. When the motion of the user of the communication source has indicated a change of motion corresponding to this table of reaction request information, the correction unit 305 determines that a reaction request motion has been made, acquires a request motion label, and proceeds to step S1805. On the other hand, when the correction unit 305 determines that the motion of the user of the communication source is not a reaction request motion, the correction unit 305 does not make a delay correction and ends the process.

Referring back to FIG. 18, in step S1804, when the correction unit 305 determines that the motion of the user of the communication source is a reaction request motion, the correction unit 305 determines whether a total delay time, which is a total of the predetermined delay time and the communication delay, is greater than or equal to a threshold defined in advance (step S1805). Here, when the total delay time is greater than or equal to the threshold, the process proceeds to step S1806. On the other hand, when the total delay time is less than the threshold, the correction unit 305 does not make a correction and ends the process.

In step S1805, when the total delay time is greater than or equal to the threshold, the correction unit 305 determines whether it is possible to correct the motion of the user of the communication destination, based on the detected first motion type (step S1806).

FIG. 20 illustrates an example of correction possibility information according to the second embodiment. In the table of the correction possibility information, the motion type detected by the detection unit 304, and the possibility of correction are associated with each other. The correction unit 305 determines whether it is possible to correct the motion of the user of the communication destination, based on this table of the correction possibility information, and when correction is possible, the process proceeds to step S1807. On the other hand, when correction is not possible, the correction unit 305 does not make a correction and ends the process.

In step S1807 of FIG. 18, an additional correction is made on the motion information of the user of the communication destination. For example, the correction unit 305 makes the above additional correction on the motion information that has been corrected in step S1706 of FIG. 7.

FIG. 21 illustrates an example of delay correction information according to the second embodiment. In the table of delay correction information, a request motion label and a correction motion are associated with each other. This request motion label corresponds to the request motion label of the table of the reaction request information of FIG. 19. Therefore, in step S1804, when the correction unit 305 determines that the motion of the user of the communication source is a reaction request motion, the correction unit 305 acquires a request motion label corresponding to the motion change of the user, from the table of reaction request information of FIG. 19. Then, in step S1807, the correction unit 305 determines the correction content corresponding to the acquired request motion label from the table of delay correction information of FIG. 21, and makes an additional correction to the motion information to be output to the generation unit 306.

Note that in the above description, the correction unit 305 makes the correction for compensating for the delay time; however, a second correction unit may be separately provided for making the above additional correction.

Summary (Second Embodiment)

As described above, according to the present embodiment, a predetermined delay time is provided before the correction unit 305 makes a correction, such that the motion can be corrected upon acquiring sufficient information, and therefore motions can be corrected even more appropriately.

Furthermore, a correction of compensating for the motion of the user of the communication destination is made, with respect to a reaction request motion, while the above predetermine delay and a communication delay are occurring, and therefore it is possible to reduce adverse effects on communications such as collision and silence.

Overview

As described above, according to the above embodiments, in a remote conference using objects of users such as avatars, the information processing device determines the meaning of motion information relevant to non-verbal communications such as motions of the user after receiving the motion information or before sending the motion information. Furthermore, the information processing device corrects the motions of the object of the user so that the communication partner can easily comprehend the determined meaning.

Furthermore, the information processing device includes appeal mode used when correcting the motion of the object of the user, by which a correction is made by exaggeration such as deformation, which cannot be expressed by motions of an actual human being, and therefore communications in a remote conference can be further facilitated.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

According to one embodiment of the present invention, an information processing device is provided, which is capable of reducing the communication gap due to different cultures and facilitating communications with a remote location, in communications performed via a network.

The information processing device, the information processing system, and the information processing method are not limited to the specific embodiments described herein, and variations and modifications may be made without departing from the spirit and scope of the present invention.

The present application is based on and claims the benefit of priority of Japanese Priority Patent Application No. 2013-166760, filed on Aug. 9, 2013, the entire contents of which are hereby incorporated herein by reference.

What is claimed is:

1. An information processing device located at a second spot for performing communication with another information processing device located at a first spot, the information processing device comprising:
    a first acquisition unit configured to acquire first motion information of a user of the other information processing device at the first spot;
    a first specification unit configured to specify first meaning information indicating a meaning of the first motion information at the first spot and second meaning information indicating a meaning of the first meaning information at the second spot;
    a first correction unit configured to correct the first motion information based on a difference between the first meaning information and the second meaning information, such that the first motion information indicates the first meaning information at the second spot; and
    a generation unit configured to generate an object of the user of the other information processing device at the first spot, based on the first motion information that has been corrected.

2. The information processing device according to claim 1, further comprising:
    a motion mode configured to express a motion of the object in an exaggerated manner, with a motion that is different from a motion relevant to the first motion information that has been corrected.

3. The information processing device according to claim 2, wherein
    the motion mode that expresses the motion of the object in an exaggerated manner changes at least one of a size, a color, a shape, and a transparency of the object, based on a voice sound level of the user of the other information processing device at the first spot or a user of the information processing device at the second spot.

4. The information processing device according to claim 1, further comprising:
    one or more of motion modes configured to generate the object by performing at least one of emphasizing and suppressing a motion relevant to the first motion information that has been corrected.

5. The information processing device according to claim 1, further comprising:
    a plurality of correction contents corresponding to the first motion information that has been corrected, wherein one correction content is selected from the plurality of correction contents in a random manner or by a probability that has been defined in advance.

6. The information processing device according to claim 1, wherein
the first acquisition unit acquires information relevant to the first spot from the other information processing device of the first spot, and
the first specification unit specifies the first meaning information based on the information that has been acquired.

7. The information processing device according to claim 1, wherein
the first correction unit corrects the first motion information after a predetermined delay time has passed.

8. The information processing device according to claim 7, further comprising:
a second acquisition unit configured to acquire second motion information of a user of the information processing device at the second spot;
a second specification unit configured to specify a first motion type of the user of the other information processing device at the first spot based on the first motion information, and to specify a second motion type of the user of the information processing device at the second spot based on the second motion information;
a detection unit configured to detect a communication delay between the other information processing device at the first spot and the information processing device at the second spot; and
a second correction unit configured to correct the first motion information that has been corrected, according to a delay time including the predetermined delay time and the communication delay, the first motion type, and the second motion type.

9. An information processing system for performing communication between an information processing device located at a second spot and another information processing device located at a first spot, the information processing system comprising:
a first acquisition unit configured to acquire first motion information of a user of the other information processing device at the first spot;
a first specification unit configured to specify first meaning information indicating a meaning of the first motion information at the first spot and second meaning information indicating a meaning of the first meaning information at the second spot;
a first correction unit configured to correct the first motion information based on a difference between the first meaning information and the second meaning information, such that the first motion information indicates the first meaning information at the second spot; and
a generation unit configured to generate an object of the user of the other information processing device at the first spot, based on the first motion information that has been corrected.

10. An information processing method comprising:
starting communication between an information processing device located at a second spot and another information processing device located at a first spot;
acquiring first motion information of a user of the other information processing device at the first spot;
specifying first meaning information indicating a meaning of the first motion information at the first spot and second meaning information indicating a meaning of the first meaning information at the second spot;
correcting the first motion information based on a difference between the first meaning information and the second meaning information, such that the first motion information indicates the first meaning information at the second spot; and
generating an object of the user of the other information processing device at the first spot, based on the first motion information that has been corrected.

11. The information processing method according to claim 10, further comprising:
expressing, by a motion mode, a motion of the object in an exaggerated manner, with a motion that is different from a motion relevant to the first motion information that has been corrected.

12. The information processing method according to claim 11, wherein
the expressing the motion of the object in an exaggerated manner by the motion mode, includes changing at least one of a size, a color, a shape, and a transparency of the object, based on a voice sound level of the user of the other information processing device at the first spot or a user of the information processing device at the second spot.

13. The information processing method according to claim 10, further comprising:
generating the object by one or more of motion modes, by performing at least one of emphasizing and suppressing a motion relevant to the first motion information that has been corrected.

14. The information processing method according to claim 10, further comprising:
selecting one correction content from a plurality of correction contents in a random manner or by a probability that has been defined in advance, the plurality of correction contents corresponding to the first motion information that has been corrected.

15. The information processing method according to claim 10, wherein
the acquiring includes acquiring information relevant to the first spot from the other information processing device of the first spot, and
the specifying includes specifying the first meaning information based on the information that has been acquired.

16. The information processing method according to claim 10, wherein
the correcting includes correcting the first motion information after a predetermined delay time has passed.

17. The information processing method according to claim 16, further comprising:
acquiring second motion information of a user of the information processing device at the second spot;
specifying a first motion type of the user of the other information processing device at the first spot based on the first motion information, and to specifying a second motion type of the user of the information processing device at the second spot based on the second motion information;
detecting a communication delay between the other information processing device at the first spot and the information processing device at the second spot; and
correcting the first motion information that has been corrected, according to a delay time including the predetermined delay time and the communication delay, the first motion type, and the second motion type.

* * * * *